(12) United States Patent
Yang

(10) Patent No.: US 11,682,805 B2
(45) Date of Patent: Jun. 20, 2023

(54) THERMAL RUNAWAY SUPPRESSION ELEMENT AND THE RELATED APPLICATIONS

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 115 days.

(21) Appl. No.: 17/372,084

(22) Filed: Jul. 9, 2021

(65) Prior Publication Data
US 2022/0037711 A1     Feb. 3, 2022

Related U.S. Application Data

(60) Provisional application No. 63/087,563, filed on Oct. 5, 2020, provisional application No. 63/058,205, filed on Jul. 29, 2020.

(51) Int. Cl.
*H01M 10/00*     (2006.01)
*H01M 10/653*     (2014.01)
(Continued)

(52) U.S. Cl.
CPC ..... *H01M 10/653* (2015.04); *H01M 10/0525* (2013.01); *H01M 10/4235* (2013.01); *H01M 4/661* (2013.01)

(58) Field of Classification Search
CPC .. H01M 10/653; H01M 10/65; H01M 10/655; H01M 10/656; H01M 10/654;
(Continued)

(56) References Cited

U.S. PATENT DOCUMENTS

| | | |
|---|---|---|
| 2010/0021801 A1 | 1/2010 | Park et al. |
| 2013/0171484 A1 | 7/2013 | Baginska et al. |

(Continued)

FOREIGN PATENT DOCUMENTS

| | | |
|---|---|---|
| CN | 106469794 A | 3/2017 |
| CN | 109063410 A | 12/2018 |

(Continued)

OTHER PUBLICATIONS

Extended European Search Report dated Jan. 4, 2022 in Application No. 21188016.6.

(Continued)

*Primary Examiner* — Raymond Alejandro
(74) *Attorney, Agent, or Firm* — Rabin & Berdo, P.C.

(57) ABSTRACT

A suppression element includes a passivation composition supplier and a polar solution supplier. The passivation composition supplier is capable of releasing a metal ion (A), selected from a non-lithium alkali metal ion, an alkaline earth metal ion or a combination thereof, and an aluminum etching ion (B). The polar solution of the polar solution supplier carries the metal ion (A) and the aluminum etching ion (B) to an aluminum current collector to etched through thereof, and the metal ion (A) and the aluminum ion, generated during the etching, are seeped into the electrochemical reaction system. Then, the positive active material is transferred to a crystalline state with lower electric potential and lower energy, and the negative active material is transferred y to an inorganic polymer state with higher electric potential and lower energy to prevent the thermal runaway from occurring.

26 Claims, 15 Drawing Sheets

(51) Int. Cl.
H01M 10/0525 (2010.01)
H01M 10/42 (2006.01)
H01M 4/66 (2006.01)

(58) Field of Classification Search
CPC ......... H01M 10/6551; H01M 10/0525; H01M 10/052; H01M 10/4235; H01M 10/4242; H01M 10/661
See application file for complete search history.

(56) References Cited

U.S. PATENT DOCUMENTS

| | | | |
|---|---|---|---|
| 2014/0154533 A1 | 6/2014 | Schaefer et al. | |
| 2015/0111086 A1 | 4/2015 | Arnold et al. | |
| 2016/0141720 A1 | 5/2016 | Onozaki et al. | |
| 2017/0146191 A1* | 5/2017 | Gehlhausen | F17C 13/12 |
| 2017/0338513 A1* | 11/2017 | Chiang | H01M 4/134 |
| 2018/0019476 A1 | 1/2018 | Qiao et al. | |
| 2020/0168877 A1 | 5/2020 | Lee et al. | |
| 2020/0373584 A1* | 11/2020 | Morin | H01M 50/583 |
| 2021/0344086 A1* | 11/2021 | Fan | H01M 50/581 |

FOREIGN PATENT DOCUMENTS

| | | |
|---|---|---|
| EP | 3591737 A1 | 1/2020 |
| JP | 2010507898 A | 3/2010 |
| JP | 2016062872 A | 4/2016 |
| WO | 2020086310 A1 | 4/2020 |

OTHER PUBLICATIONS

Extended European Search Report dated Jan. 7, 2020 in Application No. 21188019.0.
Extended European Search Report dated Jan. 7, 2022 in Application No. 21188020.8.

* cited by examiner

THERMAL RUNAWAY SUPPRESSION ELEMENT AND THE RELATED APPLICATIONS

CROSS REFERENCES TO RELATED APPLICATIONS

This application claims benefit under 35 U.S.C.§ 119(a) of U.S. Provisional Patent Application No. 63/058,205 filed Jul. 29, 2020 and U.S. Provisional Patent Application No. 63/087,563 filed Oct. 5, 2020, and the entire contents of which are hereby incorporated by reference for all purposes.

BACKGROUND OF THE INVENTION

Field of Invention

The present invention relates to a safety mechanism of the lithium batteries, in particular to a thermal runaway suppression element disposed in the lithium batteries and the related applications.

Related Art

Because lithium-ion batteries are widely used in various products, such as vehicles, wearable products for consumers and industrial applications, portable devices and energy storage devices and so on, they are almost applied in all areas of human daily life. However, the event of accidents for the lithium-ion batteries are heard from time to time, such as the fire or explosion of mobile phone batteries and electric vehicles. These are all because the lithium batteries still lack comprehensive and effective solutions for safety issues.

The main cause of unsafe event for fire or explosion in the lithium batteries is the thermal runaway. And the main cause of the thermal runaway of the lithium batteries is heat, which is the exothermic reactions result from the thermal cracking, induced by the elevated temperature, of the SEI (solid electrolyte interface) film, the electrolyte, the binder, and the positive and negative active materials in the battery. The current methods for suppression thermal runaway can be classified into two types: outside the battery cell and inside the battery cell, depending on the activated location for safety mechanism. For the type of outside the battery cell, a monitoring system is utilized, which uses digital arithmetic simulation. For the type of inside the battery cell, it can be further divided into physical or chemical methods. In the digital monitoring system outside the battery cell, the dedicated protection circuit and the dedicated management system on the outside of the battery cell are utilized to enhance the safety monitoring of the battery during the usage process. For the physical type of inside the battery cell, such as thermal shutdown separator, at elevated temperature for the battery cell, the holes of the separator are closed to block the passage of the ions.

For the chemical type of inside the battery cell, it can be defined as a scale controlled type or an electrochemical reaction type. In the scale controlled type, the flame retardant is added into the electrolyte to control the scale of the thermal runaway. The examples of the electrochemical reaction types are as follows:

a. The monomer or oligmar is added into the electrolyte. The polymerization will be occurred when the temperature rises to reduce the rate of the ion migration. Therefore, the ionic conductivity decreases as the temperature rises, and the electrochemical reaction rate in the cell slows down;

b. A positive temperature coefficient (PTC) resistance material is sandwiched between the positive electrode layer or the negative electrode layer and the adjacent current collecting layer. When the temperature of the battery cell is elevated, the electrical insulation ability is enhanced. The electric power transmission efficiency between the positive electrode layer or the negative electrode layer between the adjacent current collecting layer is reduced and the electrochemical reaction rate is also decreased; and c. A modified layer is formed on the surface of the positive active material. When the temperature of the battery cell is elevated, the modified layer is transformed into a dense film, which increases the resistance of the charge transfer to reduce the electrochemical reaction rate.

However, the above methods are aimed only for passive blocking the ion/electron migration pathway to reduce the heat generation, not for the main source to generate the maximum energy to cause the thermal runaway and the main reaction body of the entire electrochemical reaction, i.e. the active materials.

Therefore, this invention provides a thermal runaway suppression element of lithium batteries and the related applications by decreasing the thermal energy leading to thermal runaway of the active materials to mitigate or obviate the aforementioned problems.

SUMMARY OF THE INVENTION

It is an objective of this invention to provide a brand new thermal runaway suppression element and the related applications, which is capable of transferring the positive active material with lithium-ion extraction from an original state with higher electric potential and higher energy to a crystalline state of the metal oxide with lower electric potential and lower energy, and transferring the negative active material with lithium-ion insertion from an original state with lower electric potential and higher energy to an inorganic polymer state with higher electric potential and lower energy. Therefore, the electrochemical reaction pathway is blocked to prevent the thermal runaway from occurring.

Also, it is another objective of this invention to a brand new thermal runaway suppression element and the related applications, which is disposed outside of the lithium battery. Therefore, it will not affect the performance of the electrochemical reaction system of the lithium battery.

It is further objective of this invention to a brand new thermal runaway suppression element and the related applications. The aluminum current collector is etched through, and the metal ion (A) and the aluminum ion, generated during the etching, are seeped into the electrochemical reaction system of the lithium battery. The positive active material with lithium-ion extraction and the negative active material with lithium-ion insertion are transferred to a lower energy state. Therefore, the voltage of the whole battery is decreased and the electrochemical reaction pathway is blocked to prevent the thermal runaway from occurring.

In order to implement the abovementioned, this invention discloses a thermal runaway suppression element, which includes a passivation composition supplier and a polar solution supplier. The passivation composition supplier is capable of releasing a metal ion (A), selected from a non-lithium alkali metal ion, an alkaline earth metal ion or a combination thereof, and an aluminum etching ion (B). The polar solution supplier releases a polar solution to carry the metal ion (A) and the aluminum etching ion (B) to an aluminum current collector of the lithium battery. The aluminum current collector is etched through by the aluminum etching ion (B), and the metal ion (A) and the aluminum ion, generated during the etching, are seeped into the electrochemical reaction system of the lithium battery. The positive active material with lithium-ion extraction and the negative active material with lithium-ion insertion are reacted with the metal ion (A) and are transferred to a lower energy state. Therefore, the voltage of the whole battery is decreased and the electrochemical reaction pathway is blocked to prevent the thermal runaway from occurring.

This invention further discloses a battery structure capable of suppressing thermal runaway, which includes a lithium battery with an aluminum current collector. The above-mentioned thermal runaway suppression element is disposed on an open-side surface of the aluminum current collector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
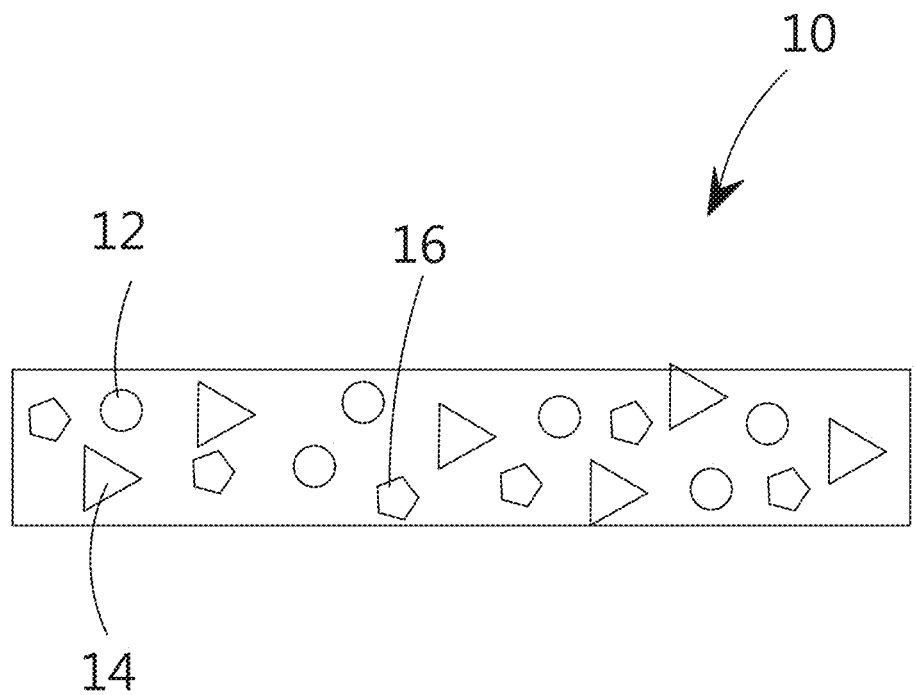
FIGS. 1A-1C are schematic diagrams of the embodiments of the thermal runaway suppression element of this invention.

The present invention will be described with respect to particular embodiments and with reference to certain drawings but the invention is not limited thereto but only by the claims Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

First, the invention is related to a thermal runaway suppression element, which includes a passivation composition supplier and a polar solution supplier. The passivation composition supplier is capable of releasing a metal ion (A) and an aluminum etching ion (B). The polar solution supplier releases a polar solution to carry the metal ion (A) and the aluminum etching ion (B) to etch an aluminum current collector of the lithium battery. After the aluminum current collector, i.e. the positive current collector, is etched through by the aluminum etching ion (B), and the metal ion (A), the residual aluminum etching ion (B) and the aluminum ion, generated during the etching, are seeped into the electrochemical reaction system of the lithium battery. The positive active material with lithium-ion extraction and the negative active material with lithium-ion insertion are reacted to transfer to a lower energy state. Therefore, the electrochemical reaction pathway is blocked to prevent the thermal runaway from occurring.

The metal ion (A), selected from a non-lithium alkali metal ion, an alkaline earth metal ion or a combination thereof. When the metal ion (A) is selected from the non-lithium alkali metal ion, which is preferably selected from a sodium ion, a potassium ion or a combination thereof. When the metal ion (A) is selected from the alkali earth metal ion, which is preferably selected from a beryllium ion, a magnesium ion or a calcium ion. The aluminum etching ion (B) is selected from an alkaline material, such as a hydroxide ion, or an acidic material, such as a nitrate ion. Also, the passivation composition supplier may further include an amphoteric metal ion (C), which is preferably selected from an aluminum ion or a zinc ion. The passivation composition supplier is a solution or an anhydrous powder. The above-mentioned "carry" means that the polar solution is served as a transmission medium for the metal ion (A) and the aluminum etching ion (B).

For the positive active material, the metal ion (A) will obtain electrons from the positive active material with lithium-ion extraction and deposit thereof, and then further migrate to occupy the positive of the lithium-ion extraction, or the intercalation. The positive active material with lithium-ion extraction is transferred from an original state with higher electric potential and higher energy to a reactant state, i.e. a crystalline state of the metal oxide, with lower electric potential and lower energy. Moreover, it is unstable in structure and easy to release oxygen substance ($O_2$, $O_2^-$, $O^-$) due to the loss of lithium atoms in the original state of the positive active material. The metal atoms formed by the metal ion (A) with electrons, such as the sodium atoms will be driven by thermal energy to fill the positive of the lithium-ion extraction, or intercalation, and relocate the lattice to form a new stable state, and at the same time, thermal energy is consumed. Further, when the metal ion (A) with electrons is filled into the positive material, the characteristics of the metal ion (A) will be induced. For example, if the sodium are filled into the positive material, this new stable state structure will represent some of the characteristics of the sodium, due to contain the sodium, such as increased adsorption of moisture. That will increase the insulating properties of the electrodes and result in a decrease in performance. For the negative active material, the metal ion (A), the aluminum ion, generated during the etching, and a further added amphoteric metal ion (C) will react with the negative active materials with lithium-ion insertion. The negative active material with lithium-ion insertion is transferred from an original state with lower electric potential and higher energy to an inorganic polymer state with higher electric potential and lower energy. Therefore, this invention can achieve to decrease the electric potential difference of the positive and the negative active materials and the voltage of the whole battery, by applying the additional metal ion (A), the aluminum ion and or further added amphoteric metal ion (C), to block the electrochemical reaction pathway to effectively avoid the thermal runaway of the battery.

Furthermore, for above-defined where the positive active material is transferred from the state with higher electric potential and higher energy to the crystalline state with lower electric potential and lower energy, the detailed description is provided below. The positive active material is in the state with lithium-ion extraction and the electric potential is higher. Also, because of the unstable crystal lattice, the crystal lattice is easy to collapse and has a higher ability to release oxygen, and to release thermal energy violently. Therefore, in the above-mentioned, it is defined that the positive active material is in the state with higher electric potential and higher energy. When the metal ion (A) with electrons fills the positions where lithium-ion is extracted or the intercalations, the electric potential of the positive active material is reduced, and the crystal lattice of the positive active material is relatively stable. Also, the stability of the crystal lattice of the positive active material is higher, and the ability of the oxygen-releasing is reduced, and the ability to release thermal energy violently is lowered. Therefore, in the above-mentioned, it is defined that the positive active material is in the passivation state after reacting with the metal ion (A) is defined as the crystalline state with lower electric potential and lower energy.

For above-defined where the negative active material is transferred from the state with lower electric potential and higher energy to the state with higher electric potential and lower energy, the detailed description is provided below. The negative active material is in the state with lithium-ion insertion and the electric potential is lower. In addition, because the negative active material receives the oxygen released from the positive active material, the negative active material is prone to violently combust and release thermal energy. Therefore, the negative active material is unstable and has a higher ability to release thermal energy. Therefore, in the above-mentioned, it is defined that the negative active material is in the state with lower electric potential and higher energy. When the metal ion (A), the aluminum ion or the further added amphoteric metal ion (C), act with the negative active material with lithium-ion insertion, the lithium-ion is captured and form the polymer compound with the base material of the negative active material, such as silicon-carbon. As well as the reduction of the ability to release oxygen of the positive active material, the ability of the negative active material to release thermal energy violently is lowered. Therefore, in the above-mentioned, it is defined that the negative active material is in the passivation state after reacting with the metal ion (A), the aluminum ion or the further added amphoteric metal ion (C), is defined as the polymer compound state with higher electric potential and lower energy. In this state, the negative active material is transformed to the geopolymer, which is a green cement.

In this embodiment, the passivation composition supplier includes at least one compound, which is capable of dissociation and releasing the metal ion (A) and the aluminum etching ion (B), such as NaOH, KOH, $NaNO_3$, $KNO_3$, or the like. The compound capable of providing the amphoteric metal ion (C) may be $AlCl_3$, $AlBr_3$, $AlI_3$, $Al(NO_3)_3$, $AlClO_4$, $AlF_3$, $AlH_3$, $Zn(OH)_2$, or the like. Also, the passivation composition supplier may be a compound capable of providing the metal ion (A), the aluminum etching ion (B) and the amphoteric metal ion (C), such as $NaAl(OH)_4$ or the like. But these are just examples, not intended to limit the type and quantity of compounds used in the present invention. Furthermore, the passivation composition supplier may be in an anhydrous state or a solution state. In the solution state, for example, it has a higher concentration, 80%-50%, with lower etching ability and higher stability. Therefore, it is necessary to adjust the concentration by the polar solution to demonstrate the etching ability for the aluminum current collector to form the through holes. In case of the passivation composition supplier is in the anhydrous state, the polar solution can dissociate the passivation composition supplier to release the metal ion (A) and the aluminum etching ion (B) or even the amphoteric metal ion (C). Moreover, the concentration of the aluminum etching ion (B), such as the hydroxide ion, is adjusted by the polar solution to demonstrate the etching ability for aluminum, such as 30%-20%.

The polar solution supplier is water-releasing compound decomposed endothermically to release water or a pure water. The polar solution is used to dissociate the passivation composition supplier to release the metal ion (A) and the aluminum etching ion (B) or even the amphoteric metal ion (C), and adjust the concentration of the aluminum etching ion (B) to demonstrate the etching ability for aluminum. Also, due to the fluidity of the polar solution, the metal ion (A), the aluminum etching ion (B) and the aluminum ion, generated during the etching, are carried by the polar solution to seep into the electrochemical reaction system of the lithium battery.

The thermal runaway suppression element of this invention may further include an isolating mechanism, which can avoid the instability caused by direct contact of different materials between the passivation composition supplier and the polar solution supplier. The isolating mechanism may be a protecting layer or a capsule without holes, or a polymer film with holes, which may further include the film-forming agent below.

In case of the protecting layer or the capsule without holes, take the protecting layer for example, the protecting layer is composed of a thermosensitive decomposition material or a dissolvable material, which is dissolved in the polar solution. The temperature of the thermosensitive decomposition material to be decomposed is 70-130° C. The protecting layer and the capsule are both used to separate the passivation composition supplier and the polar solution supplier, but have different applications. The protecting layer is used to isolate the film-type material by coating the protecting layer on the outer surface of the single-layer or multiple layers film-type material. The capsule is used to isolate the powder or liquid material to divide into portions in the capsule to avoid direct contact between the two different materials. The polymer film with through holes is used to cover the materials in a non-fluid state. When the polar solution supplier releases the polar solution, the polar solution will contact to the passivation composition supplier via the through holes as a transmission path. The material of the polymer film may be the film-forming agent, as described below.

The above-mentioned water-releasing compound decomposed endothermically to release water may be selected from $Al(OH)_3$, $Al(OH)_3.H_2O$, $Mg(OH)_2$, $NH_4H_2PO_4$, $NaHCO_3$, $CH_3COONa.3H_2O$, $ZnOB_2O_3H_2O$, $Na_2B_4O_7.10H_2O$, anhydrous $CaCl$, $CaCl.H_2O$, $CaCl.2H_2O$, $CaCl.4H_2O$, $MgCl.6H_2O$, $KAl(SO_4)_2.12H_2O$, $Zn(OH)_2$, $Ba(OH)_2.8H_2O$, $LiOH$, or a combination thereof.

The thermosensitive decomposition material, which is selected from paraffin oil, microcrystalline wax, polyethylene wax, low density PE(polyethylene), poly(trans-1,4-butadiene), poly(tetramethylene oxide), isotactic poly(methyl methacrylate), poly(ethylene oxide), poly(ethylene adipate), isotactic poly(l-butene), poly(ethylene). Also, the thermosensitive decomposition material is mixed with a mineral oil to lower softening points.

In the invention, the protecting layer of the thermal runaway suppression element is made of the thermosensitive decomposition material or the water-releasing material decomposed endothermically. Therefore, the own thermal energy of the battery is utilized to trigger the thermal runaway suppression element to release the metal ion (A) and the aluminum etching ion (B), and the ability to etch aluminum current collector. For example, when the polar solution supplier is selected from the water-releasing materials, the material of the protecting layer, used to encapsulate the passivation composition supplier, is selected from a material, which is easy to dissolve in water. Therefore, the water-releasing material decomposed endothermically is served as the thermal trigger. When the material of the polar solution supplier is the pure water, the thermosensitive decomposition material, which cannot dissolve in water, is used to encapsulate the water. Therefore, the thermosensitive decomposition material is served as the thermal trigger. In order to increase the volatilization temperature of the polar solution, a high-boiling hydrophilic material may be added in the polar solution supplier, such as glycerin or DMSO (dimethyl sulfoxide).

Figure 1B:
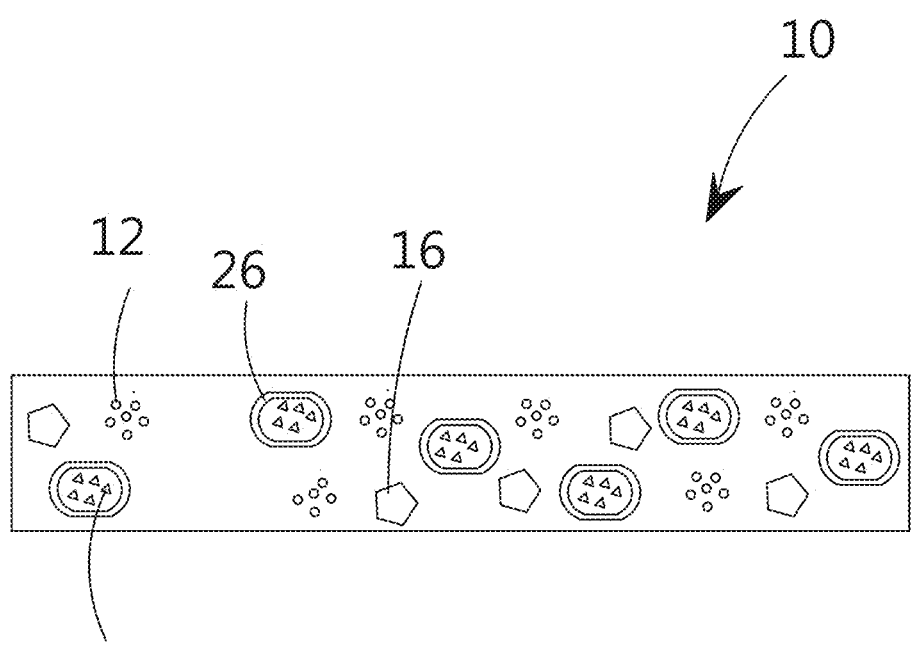
Figure 1C:
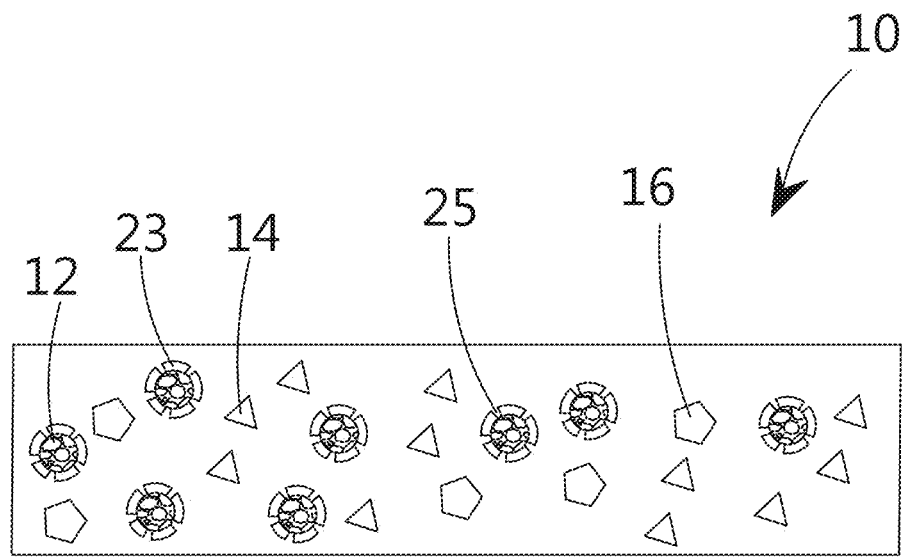

Moreover, the passivation composition supplier and/or the polar solution supplier may further mix with a film-forming agent to form a film-type thermal runaway suppression element. For example, Please see FIG. 1A, the passivation composition supplier 12 and the polar solution supplier 14 is mixed with a film-forming agent 16 required a solvent to form a film 10 by mixing, coating, drying and pressing processes. In other example, a film-forming agent 16 without solvent required, is used to mix with the passivation composition supplier 12 and the polar solution supplier 14 to form a film 10 by a thermal pressing process. Therefore, the drying process to remove the solvent is not necessary. The film-forming agent 16 without solvent required may be the polytetrafluoroethylene (PTFE). On the other hand, the film-forming agent 16 required a solvent is selected preferably from a material to remove the solvent at around 80° C., such as poly(vinylidene fluoride-hexafluoropropylene) (PVDF-HFP) using the acetone as the solvent, polyurethane (PU) using the butanone as the solvent, or styrene-butadiene rubber (SBR), carboxyl methyl cellulose (CMC) or polyacrylic acid (PAA) using the water as the solvent. In case of different materials of the passivation composition supplier 12 and the polar solution supplier 14 are mixed together, above-mentioned isolating mechanism has to be formed on one of the surface of the passivation composition supplier 12 and the polar solution supplier 14 to contact thereof. For example, the passivation composition supplier 12 and the polar solution supplier 14 is encapsulated by the capsule 26 to separate the passivation composition supplier 12 and the polar solution supplier 14, as refer to FIG. 1B. The particle size of the capsule 26 is 1-100 microns preferably. And the process of using the material of the capsule 26 to encapsulate the supplier 12, 14 may be a physical or chemical process. The physical process may be, for example, a solid-liquid phase change based on temperature change or solvent volatilization. The chemical process may be the polymerization of small monomers. When the polar solution supplier 14 is selected form the water-releasing compound, and the passivation composition supplier 12 is in an anhydrous state, the water-insoluble polymer film 23 with through holes 25 is used to cover the passivation composition supplier 12, as shown in FIG. 1C, to reduce the chance of contact between the passivation composition supplier 12 and the polar solution supplier 14. When the polar solution supplier 14 releases water, induced by the elevated temperature, the water will react with the passivation composition supplier 12 via the through holes 25 to form a liquid. Then the liquid will flow out from the through holes 25 to perform the follow-up reactions, such as etching the aluminum current collector.

Figure 2:
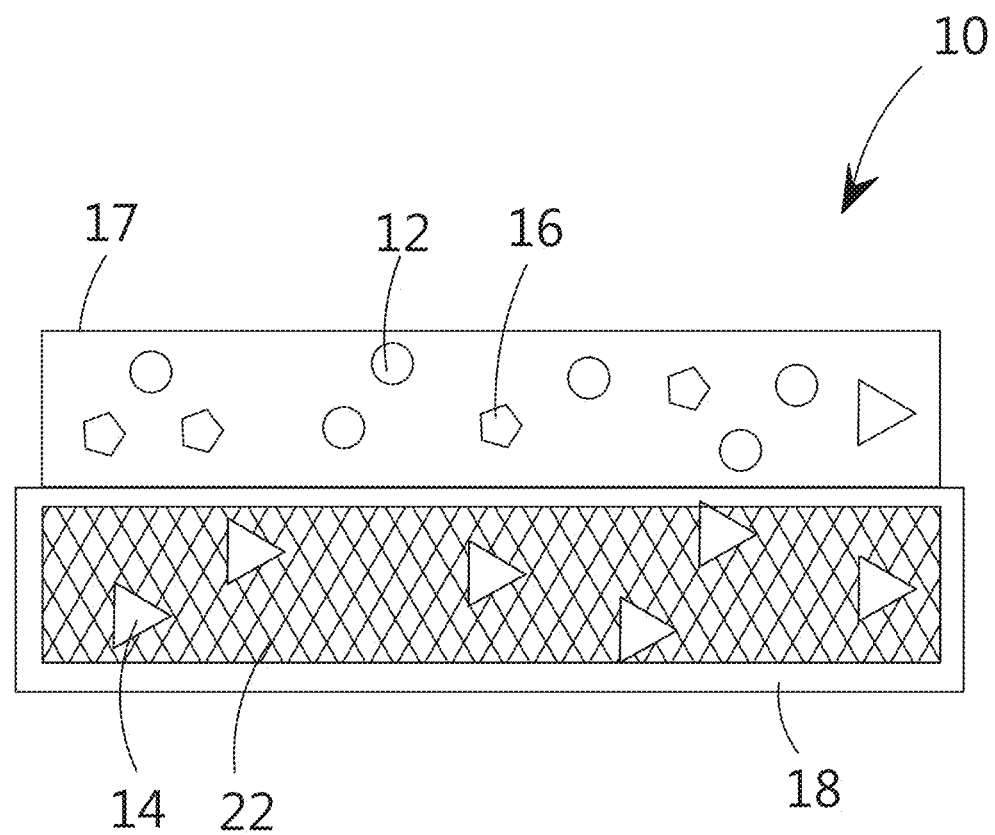
FIG. 2 is schematic diagram of another embodiment of the thermal runaway suppression element of this invention.

Moreover, a substrate may be utilized to comply with the requirement of forming the film. The film-forming agent is not necessary. For example, please to FIG. 2, the polar solution supplier 14 of the thermal runaway suppression element 10 is attached to a structural supporting material 22 to form a film. The passivation composition supplier 12 is mixed with the film-forming agent 16 to form a film 17. To avoid the instability caused by direct contact of the passivation composition supplier 12 and the polar solution supplier 14, a protecting layer 18 is coated on the outer surface of the structural supporting material 22. The structural supporting material 22 may be made of a polymer, for example, polyacrylic acid (PAA), sodium polyacrylate (sodium polyacrylate), carboxymethyl cellulose (CMC), polyurethane polymer, guar-gum, alginic acid sodium salt, polyethyleneimine (PEI), polyethylene oxide (PEO), and polyvinypirrolidone (PVP). When the structural supporting material 22 is fibers, such as a non-woven fabric, and the material may be polypropylene (PP), polyethylene terephthalate (PET) etc. or glass fibers. The structural supporting material 22 may also be composed of polymethyl methacrylate (PMMA) and polycarbonates (PC). In addition, when the structural supporting material 22 is selected from materials that is in a gel state capable of absorbing solutions, such as sodium alginate and sodium polyacrylate, which can directly absorb the compounds in the solution state. When the structural supporting material 22 is selected from materials that is in a gel state, other structural supporting materials with holes, such as non-woven fibers, may also be mixed. The material of the capsule 26 is determined by the compound to be contained. For example, when the material of the capsule 26 is easy to dissolve in water, which cannot use to contain the pure water, the material is selected from gelatin, gum arabic, chitosan, sodium caseinate, starch, lactose, maltodextrin, poly-1-lysine/alginate, polyethyleneimine/alginate, calcium alginate, polyvinyl alcohol. When the material of the capsule 26 is not easy to dissolve in water, the material is selected from ethyl cellulose, polyethylene, polymethacrylate, cellulose nitrate, silicones, paraffin, carnauba wax, stearic acid, fatty alcohols, stearyl alcohol, fatty acids, hydrocarbon resin, monoacyl glycerol, diacyl glycerol and triacyl glycerol.

For example, when the polar solution supplier 14 releases the pure water, the material of the capsule 26, used to contain the pure water, is selected from the thermosensitive decomposition material, which is not easy to dissolve in water. The passivation composition supplier 12 may be not encapsulated by the capsule, or encapsulated by the capsule 26 made of a material which is easy to dissolve in water.

Figure 3A:
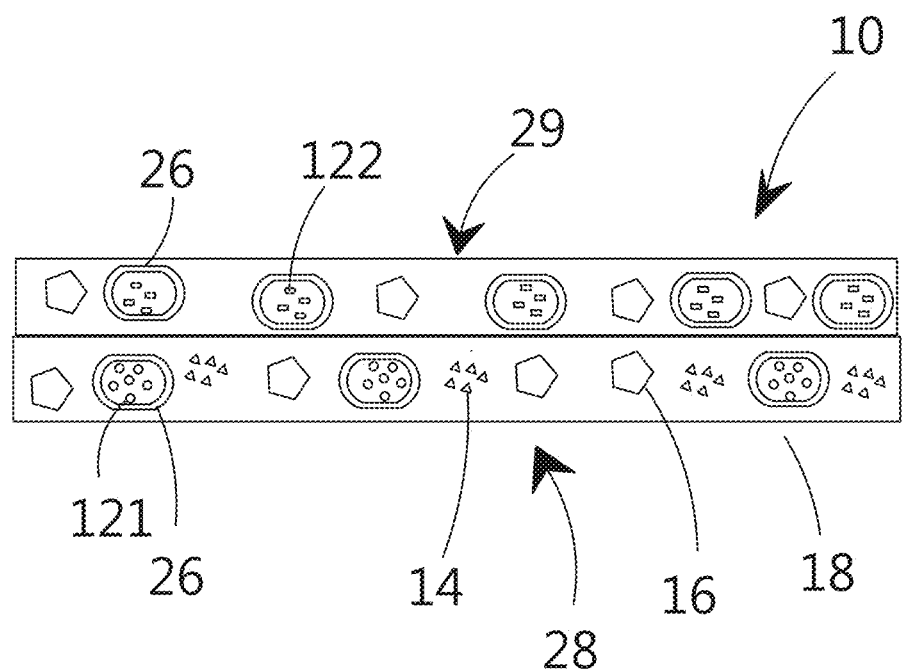
FIGS. 3A-3C are schematic diagrams of the embodiments of the layered thermal runaway suppression element of this invention.

The above-mentioned protecting or film forming methods for the passivation composition supplier 12 and the polar solution supplier 14 can be combined with each other, and are not limited only by those the drawings or the descriptions. For example, when the passivation composition supplier 12 is composed of two compounds 121, 122, the compound 121 is encapsulated with the capsule 26, and mixed with the polar solution supplier 14 and the film-forming agent 16 by mixing, coating, drying and pressing processes to form a first film 28. The compound 122 is encapsulated with a capsule 26 and mixed with the film-forming agent 16 by mixing, coating, drying and pressing processes to form a second film 29. The second film 29 is attached to a surface of the first film 28 to form a layered structure, as shown in FIG. 3A.

Figure 3B:
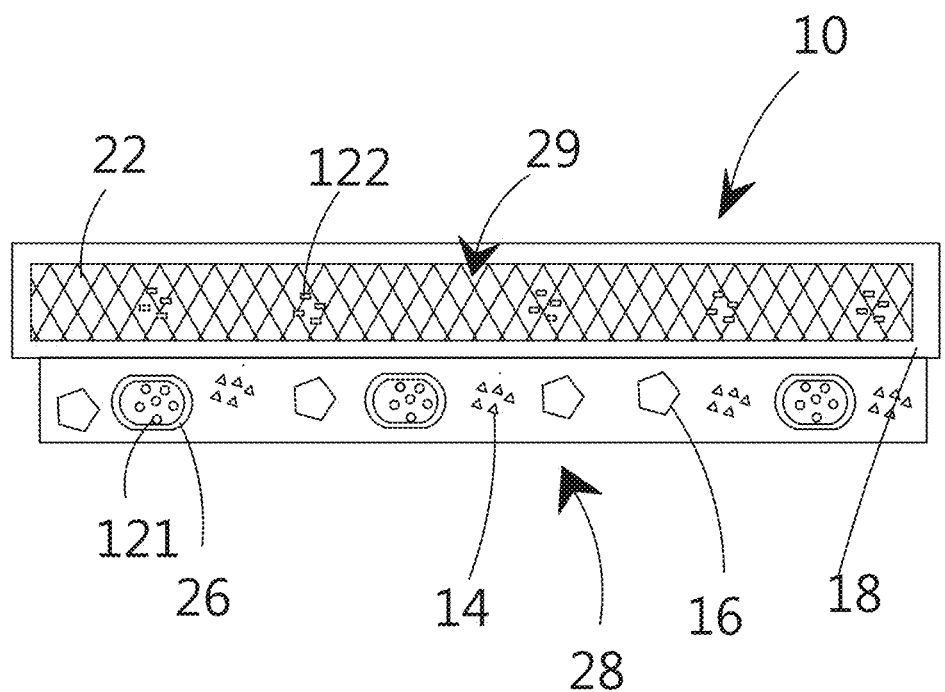
Figure 3C:
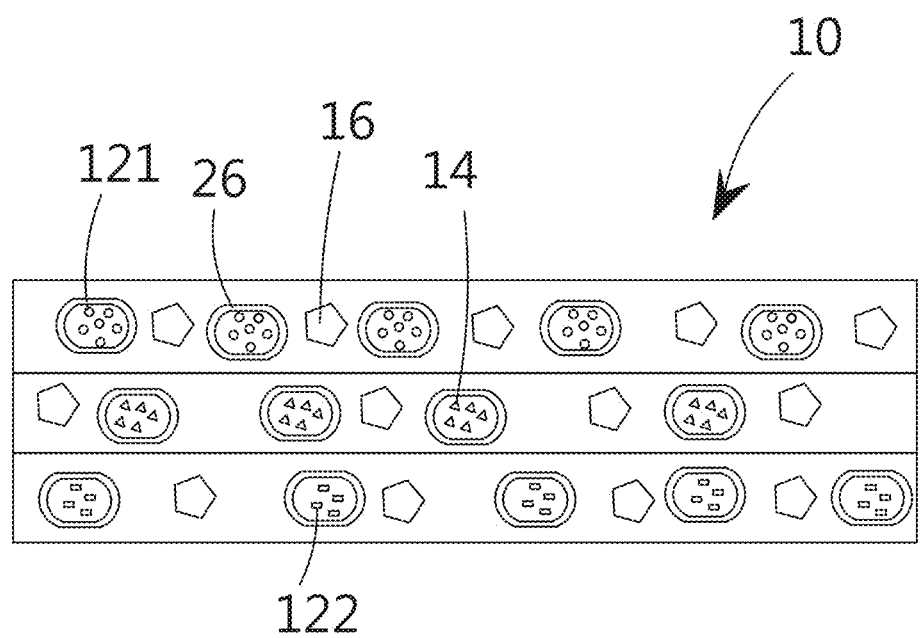

Further, FIGS. 3B, 3C are the other embodiments of the thermal runaway suppression element 10. Please refer to FIG. 3B, the compound 122 is solution-type and attached to the structural supporting material 22 with a protecting layer 18 encapsulation. One of the compound 121 is mixed with the polar solution supplier 14 and the film-forming agent 16 and encapsulated with the capsule 26 to form the film. Please refer to FIG. 3C, both the compounds 121, 122 are mixed with the polar solution supplier 14 and the film-forming agent 16 and encapsulated with the capsule 26 to form the film, respectively. The protecting or film forming methods may be varied or combined by the person skilled art. Such variations are not to be regarded as a departure from the spirit and scope of the invention.

Figure 4A:
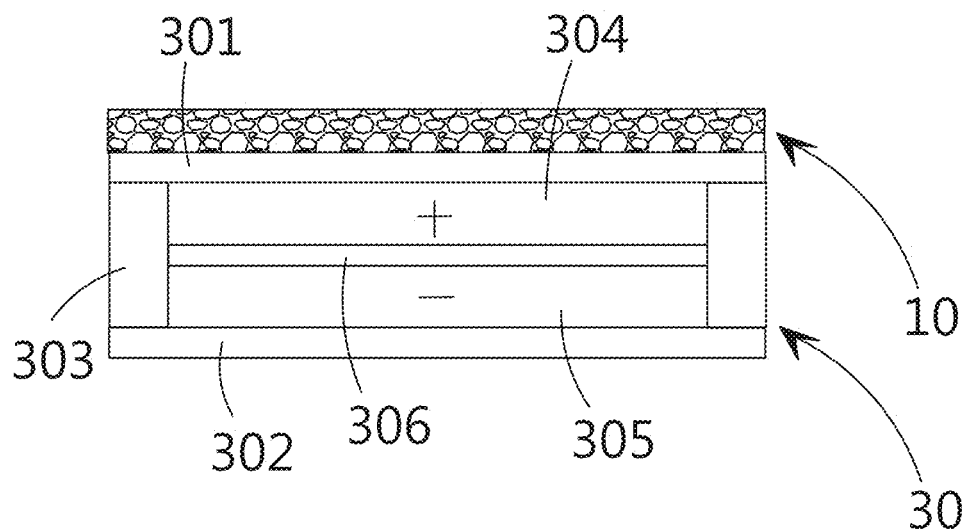
FIGS. 4A-4H are schematic diagrams of the embodiments of the thermal runaway suppression element applied for the lithium batteries of this invention.
Figure 4B:
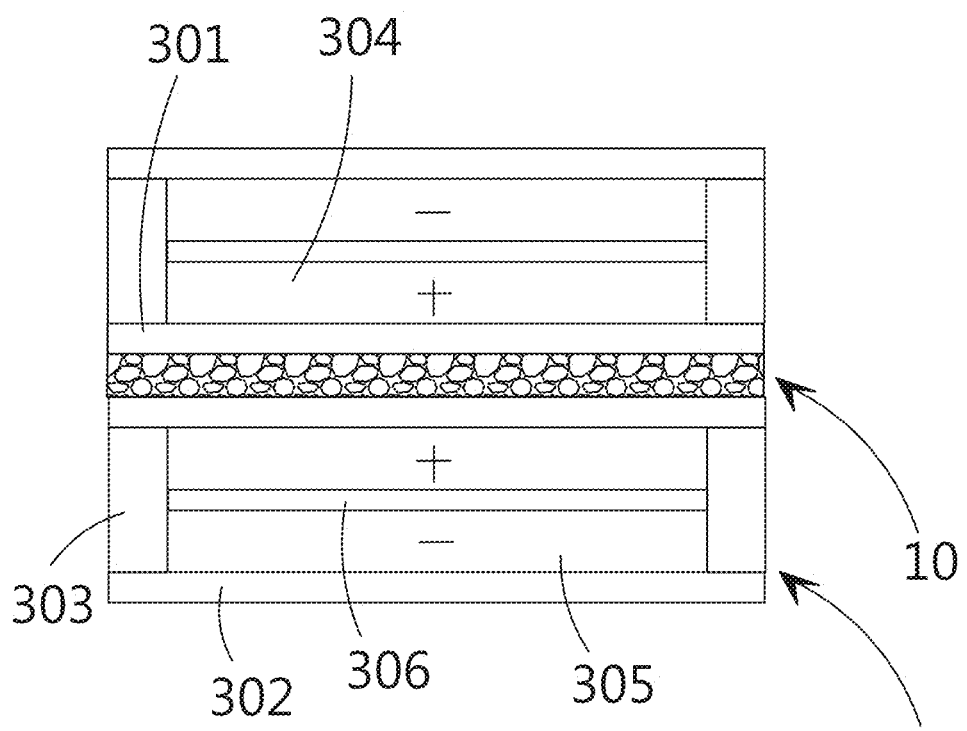

Please see FIGS. 4A-4B, which are the battery structure with the thermal runaway suppression element according to this invention. Under such structure, due to the thermal runaway suppression element is disposed outside the lithium battery, it will not affect the operation of the electrochemical reaction system. Please refer to FIG. 4A, the thermal runaway suppression element 10 is disposed on the outer surface of the positive current collector 301 of the lithium battery 30. The positive current collector 301 is an aluminum current collector. The lithium battery 30 includes a positive current collecting layer 301, a negative current collecting layer 302, a glue frame 303, an electrochemical reaction system. The glue frame 303 is sandwiched between the positive current collecting layer 301 and the negative current collecting layer 302. One end of the glue frame 303 is adhered to the positive current collecting layer 301 and the other end of the glue frame 303 is adhered to the negative current collecting layer 302. The positive current collecting layer 301, the negative current collecting layer 302 and the glue frame 303 form an enclosed space. The electrochemical reaction system arranged in the enclosed space, which includes a positive active material layer 304 adjacent to the positive current collecting layer 301 and a negative active material layer 305 adjacent to the negative current collecting layer 302. The separator 306 is located between the positive active material layer 304 and the negative active material layer 305 and has ion conduction characteristics and electrical insulation properties. The electrolyte system is located in the enclosed space and impregnated or mixed in the positive active material layer 304, the negative active material layer 305 and the separator 306 for use in ion transfer. Moreover, the positive active material layer 304 and the negative material layer 305 may further include the electrically conductive materials and the adhesive materials. Since these parts are not technical features of this invention, the detailed description is omitted herein.

In addition, the material of the separator 306 is composed of a solid electrolyte, or an electrical insulation layer with holes formed of a polymer material with coating on its surface by the ceramic powders. Also, the separator 306 may also be formed by stacking only ceramic powders by using an adhesive. The ceramic powders may not have ion conductivity, or may also have ion conductivity.

The positive current collecting layer 301, the negative current collecting layer 302, and the glue frame 303 are used as packaging component of the battery 30. The electrochemical reaction system of the battery 30 is protected by this packaging component and isolated from the outer environment. The glue frame 303 is made of a polymer material. As long as it can be adhered to the surfaces of the positive and negative current collecting layers 301, 302 and is durable to the electrolyte system. However, the thermosetting resin is preferable, for example, silicone. The negative active material may be a carbon material, a silicon-based material, or a mixture thereof. Examples of carbon materials include graphitized carbon materials and amorphous carbon materials, such as natural graphite, modified graphite, graphitized mesophase carbon particles, soft carbons, such as cokes, and some hard carbons. Silicon-based materials include silicon, silicon oxides, silicon-carbon composite materials, and silicon alloys.

The thermal runaway suppression element 10 of the invention is disposed on the outer surface of the positive current collector 301 of a lithium battery 30. The thermal runaway suppression element 10 releases the metal ion (A), the aluminum etching ion (B) and the polar solution when the temperature reaches the predetermined temperature, such as 70-130° C. The positive current collector 301 is etched through and the aluminum ions are exchanged during the etching to seep into the lithium battery 30 to react with the positive active material with lithium-ion extraction and the negative active material with lithium-ion insertion.

Figure 4C:
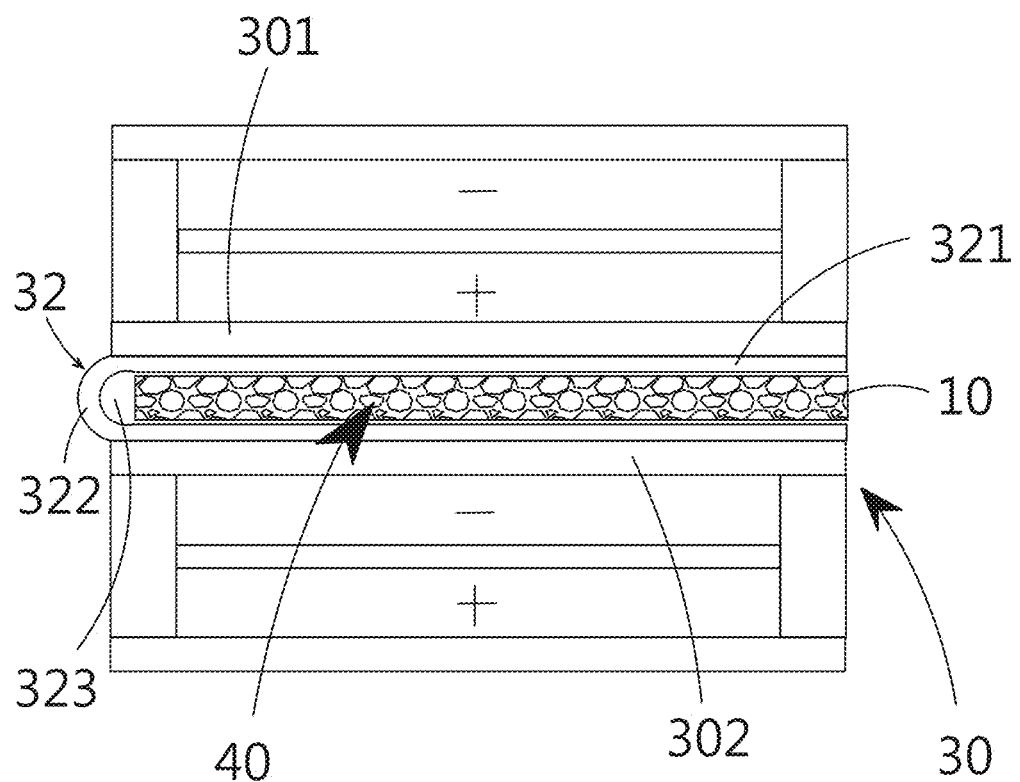
Figure 4D:
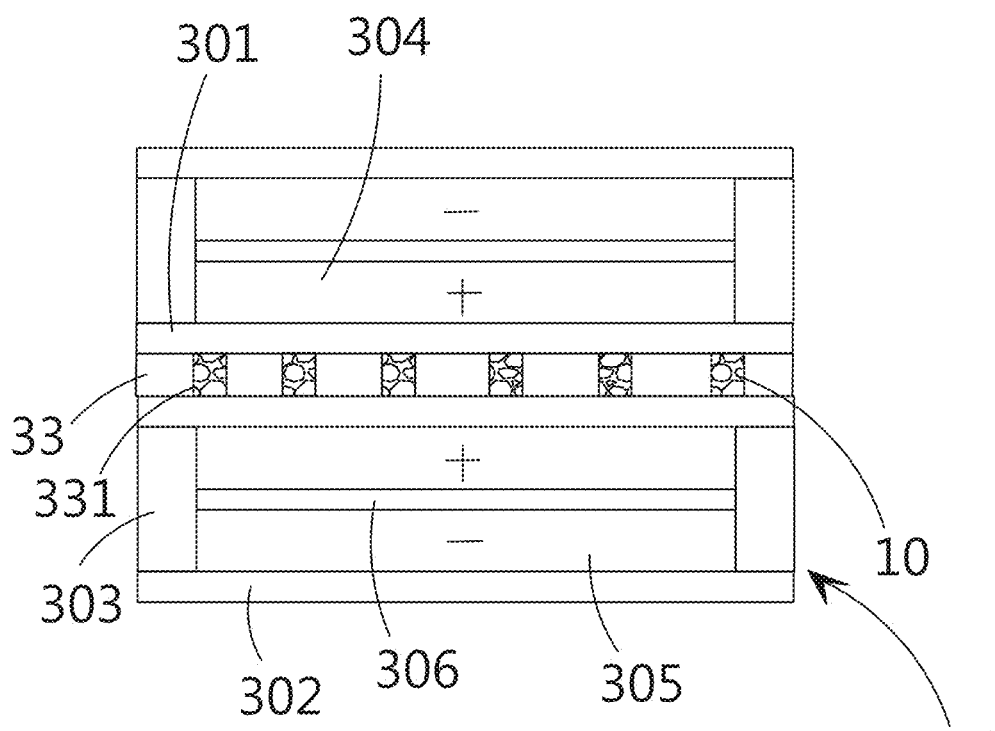

Please see FIG. 4B, which is another embodiment of the thermal runaway suppression element according to this invention applied to the battery. In this embodiment, the thermal runaway suppression element 10 can be disposed between two stacked lithium batteries 30. When the two stacked lithium batteries 30 are connected in parallel, a tab is utilized to connect thereof. Also, please refer to FIG. 4C, the thermal runaway suppression element 10 according to this invention further includes a U-shaped metal sheet 32, which is made of a material can be etched by the thermal runaway suppression element 10 or a metal mesh. The U-shaped metal sheet 32 includes two parallel arms 321 and a cross member 322 connected thereof, and the two parallel arms 321 and the cross member 322 form a space 323 to contain the thermal runaway suppression element 10. One of the parallel arm 321 is disposed on the positive current collector 301 of the lithium battery 30, and another parallel arm 321 is disposed on the negative current collector 302 of the another lithium battery 30. Therefore, the two lithium batteries 30 are electrically connected. Or as shown in FIG. 4D, the thermal runaway suppression element 10 according to this invention further includes a metal mesh frame 33 with through holes 331. The passivation composition supplier and the polar solution supplier are filed in the through holes 331. The metal mesh frame 33 is used as a container for structural supporting and used for electrical connection. In the above-mentioned embodiments, the thermal runaway suppression element 10 are located between the two stacked lithium batteries 30, which are connected in parallel or in serial.

Figure 4E:
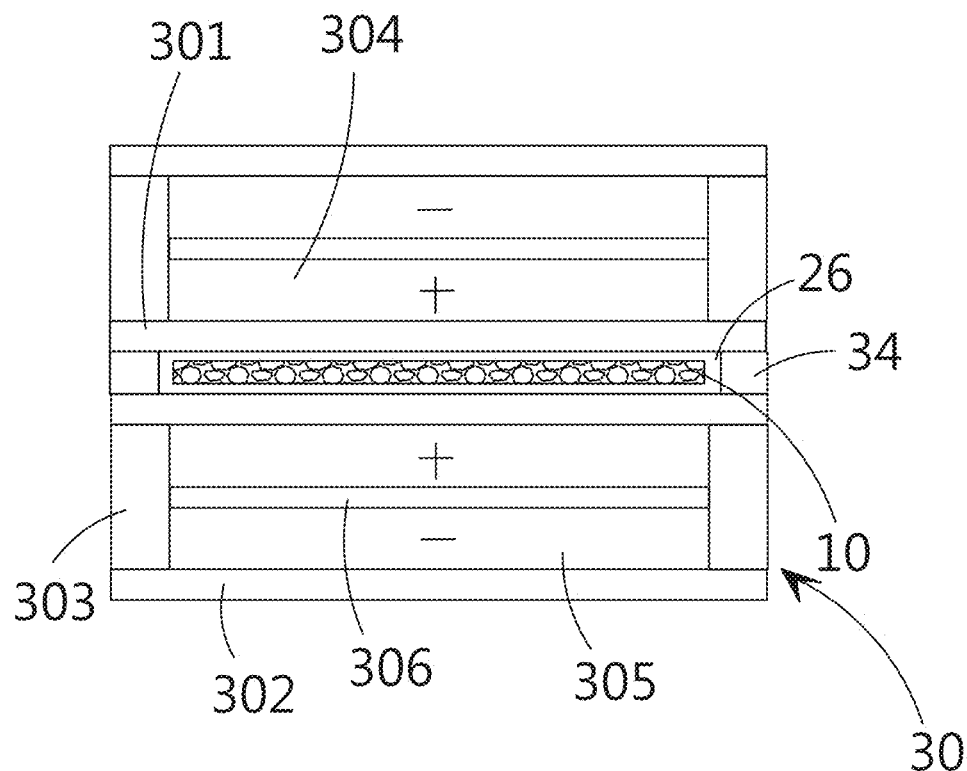

Please refer to FIG. 4E, a restricting layer 34 for an etching direction is disposed surrounded a side wall of the thermal runaway suppression element 10. The restricting layer 34 is less sensitive to external environmental variation than that of the protecting layer 18 and the capsule 26. The two end surfaces of the restricting layer 34 are adjacent to or disposed to the current collectors 301, 302 of the batteries 30. The above-mentioned external environmental variation is a change in temperature, pH or electrolyte concentration. For example, in case of the external environment variation is temperature, under such structure, compared to the restricting layer 34, the capsule 26 or the protecting layer 18 will be destroyed first caused by the temperature variation. Therefore, the passivation composition supplier 12 and the polar solution supplier 14 contained therein will be released. Also, because the surrounding restricting layer 34 is not damaged, the released ions or the polar solution are restricted inside surrounding area of the restricting layer 34. The etching direction will be constrained to the current collector 301. The above-mentioned restricting layer 34 may be mad of silicone.

Figure 4F:
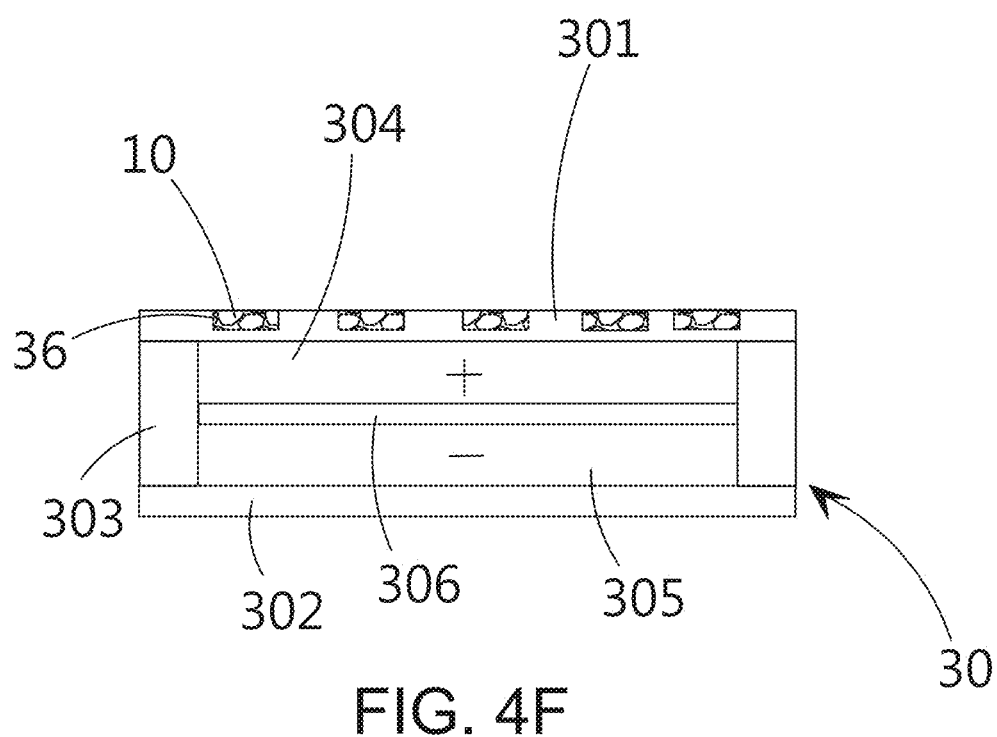
Figure 4G:
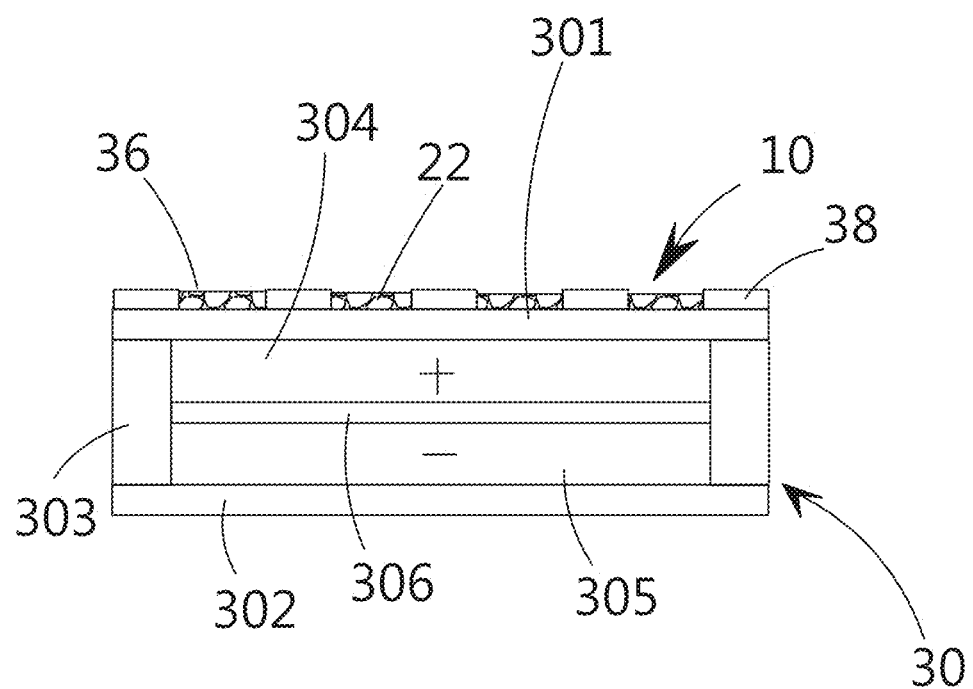
Figure 4H:
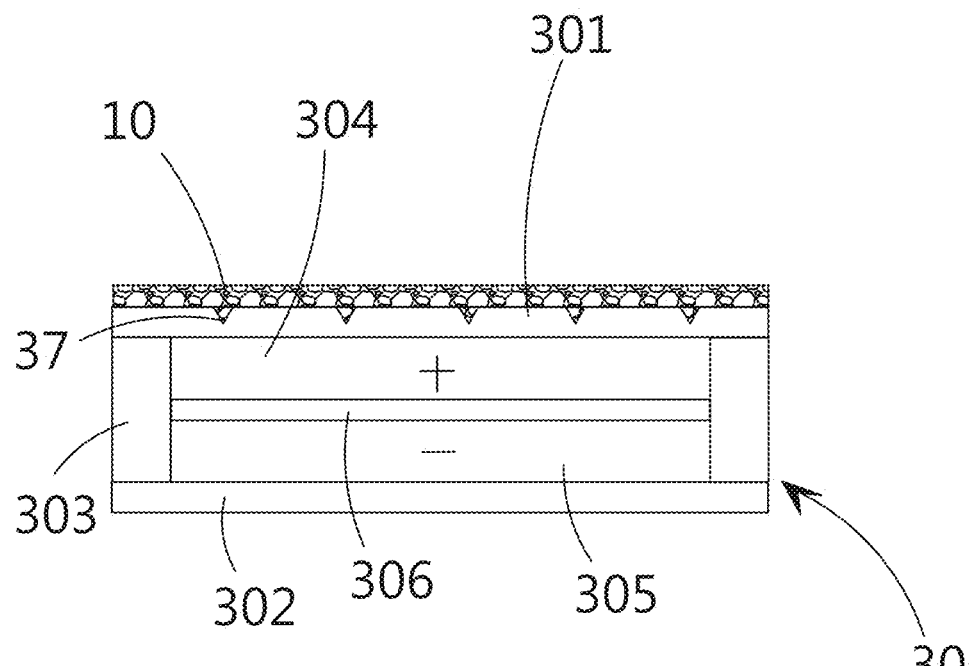

Please refer to FIG. 4F, in this embodiment, the open-side surface of the positive current collector 301 has a plurality of grooves 36 with openings. The thermal runaway suppression element 10 is filed in the groove 36. Therefore, the sidewall of the groove 36 can be used to limit the etching direction of the thermal runaway suppression element 10. Or, as shown in FIG. 4G, a plurality of bumps 38 are located on the positive current collector 301. The bumps 38 are made of a metal, a glass or a polymer, which is inert to thermal runaway suppression element 10. The bumps 38 and the portions exposed from the bumps 38 of the positive current collector 301 are form the grooves 36 for storing the thermal runaway suppression element 10. Or the open side surface of the positive current collector 301 includes a plurality of auxiliary slots 37, which do not penetrate through thereof. The auxiliary slots 37 is used to facilitate etching, as shown in FIG. 4H.

Continuing, it is to observe that the influences of the thermal runaway suppression element of this invention acting to the positive active materials with lithium-ion extraction and the negative active materials with lithium-ion insertion. In this experiment, the positive active material is NMC811, and the negative active material is silicon-carbon.

Figure 5A:
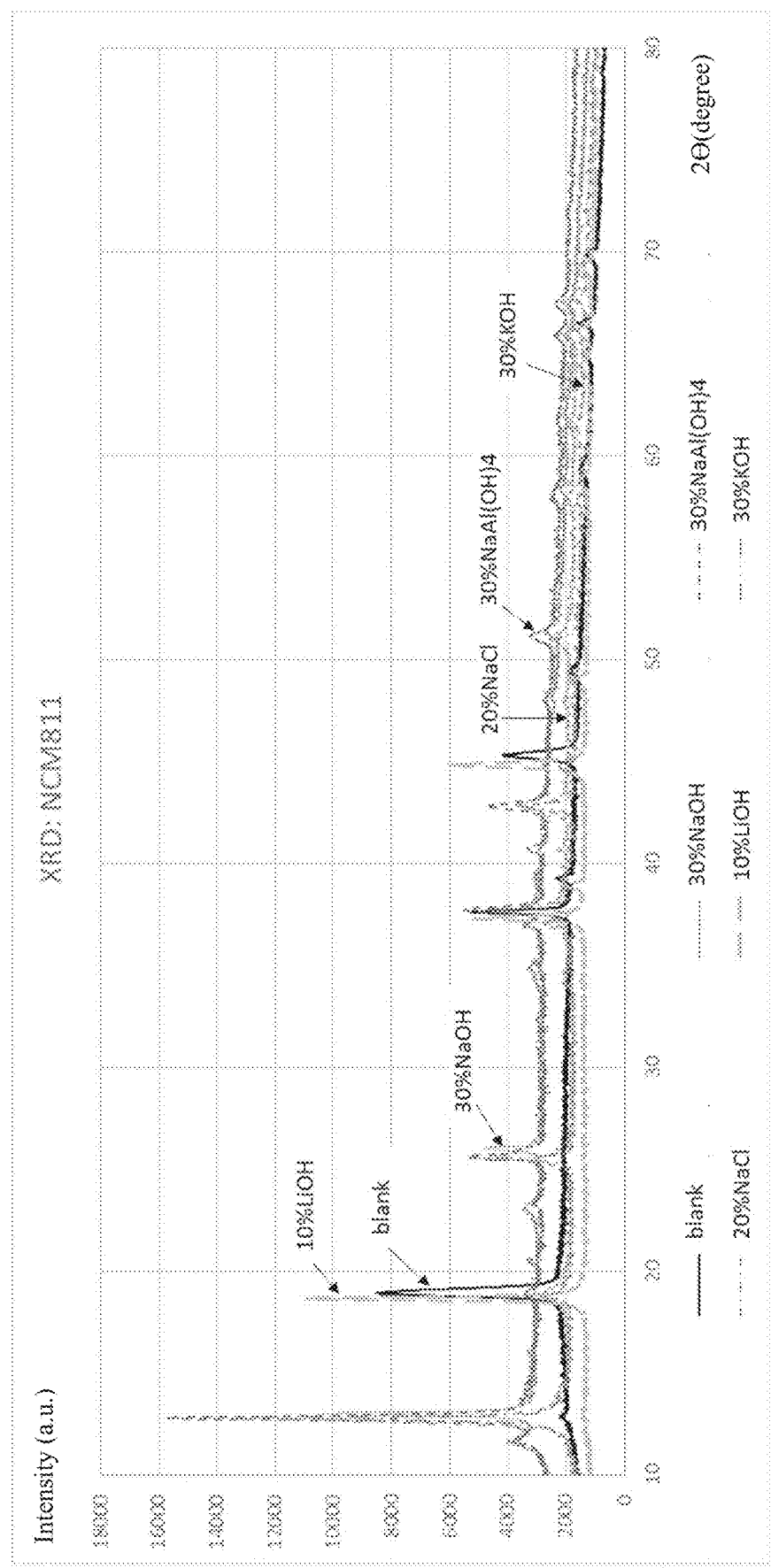
FIG. 5A is an XRD diffraction pattern in which the concentrations of 30% $NaOH_{(aq)}$, 30% $NaAl(OH)_{4(aq)}$, 30% $NaCl_{(aq)}$, 10% $LiOH_{(aq)}$, and 30% $KOH_{(aq)}$ react with the positive active material with lithium-ion extraction.

Please refer to FIG. 5A, which is an XRD diffraction pattern in which the concentrations of 30% NaOH, 30% NaAl(OH)$_4$, 30% NaCl, 10% LiOH, and 30% KOH react with the positive active material with lithium-ion extraction. It can be seen from the figure that after the NMC811 with lithium-ion extraction reacts with sodium ions, the characteristic peak (pointed by the arrows) of NMC811 is no longer existed, and the lattice structure has been changed due to the insertion of sodium or potassium ions. This may be because comparing to lithium ions, the sodium/potassium ions with larger sizes, heavier weight and higher potential energy obtain electrons on the surface of the positive active material to form sodium/potassium atoms. And by driving of the generated thermal energy, they will migrate to the intercalations with the lithium-ion extraction to form a structure with more stable and lower electrochemical potential energy.

Figure 5B:
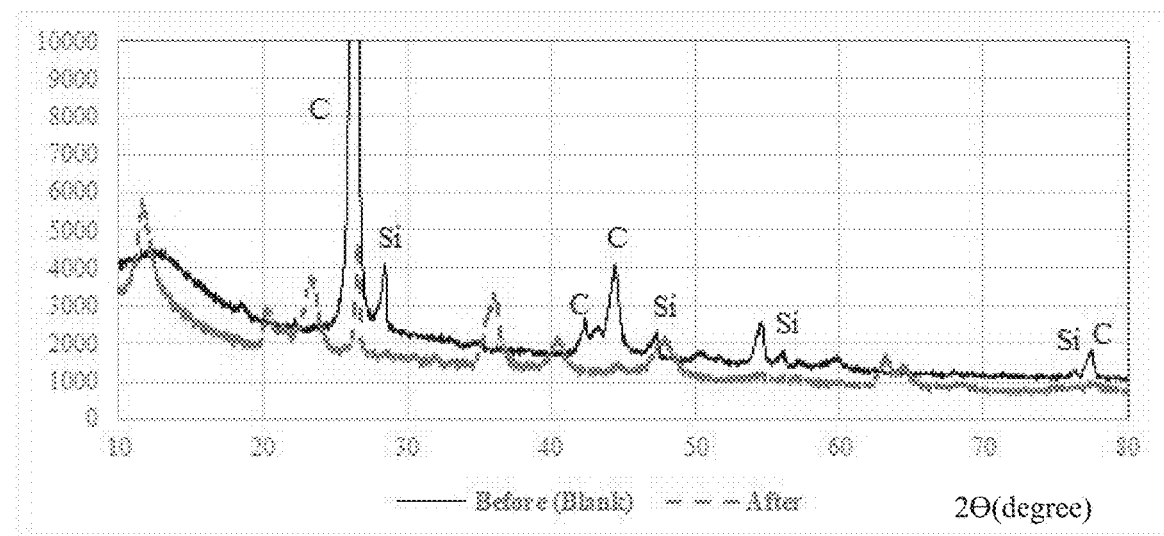
FIG. 5B is the XRD diffraction pattern before and after the negative active material with lithium-ion insertion is exposed to sodium/potassium ions and aluminum ions.

Please refer to FIG. 5B, which is the XRD diffraction pattern before and after the negative active material with lithium-ion insertion reacts with sodium/potassium ions and aluminum ions. It can be clearly found that the characteristic peaks representing Li—Si alloys have completely disappeared. It means that the Li—Si alloys have become polymer compounds with lower energy. It can be speculated that the sodium/potassium ions and the aluminum ions will form an inorganic polymer, i.e. geopolymer, with the silicon-carbon. The structure of this polymer is $M_n[-(SiO_2)_z-AlO_2]_n \cdot wH_2O$, where z is the molar ratio of Si/Al atoms, Z=1, 2, 3 or greater than 3, M is a cation, such as potassium ion ($K^+$) or sodium ion ($Na^+$), n is the degree of polymerization, and w is the molar amount of the crystal water. This inorganic compound is a closed frame structure similar to zeolite, so it can transfer the negative active materials with lithium-ion insertion into a state with higher electric potential and lower energy.

Figure 6A:
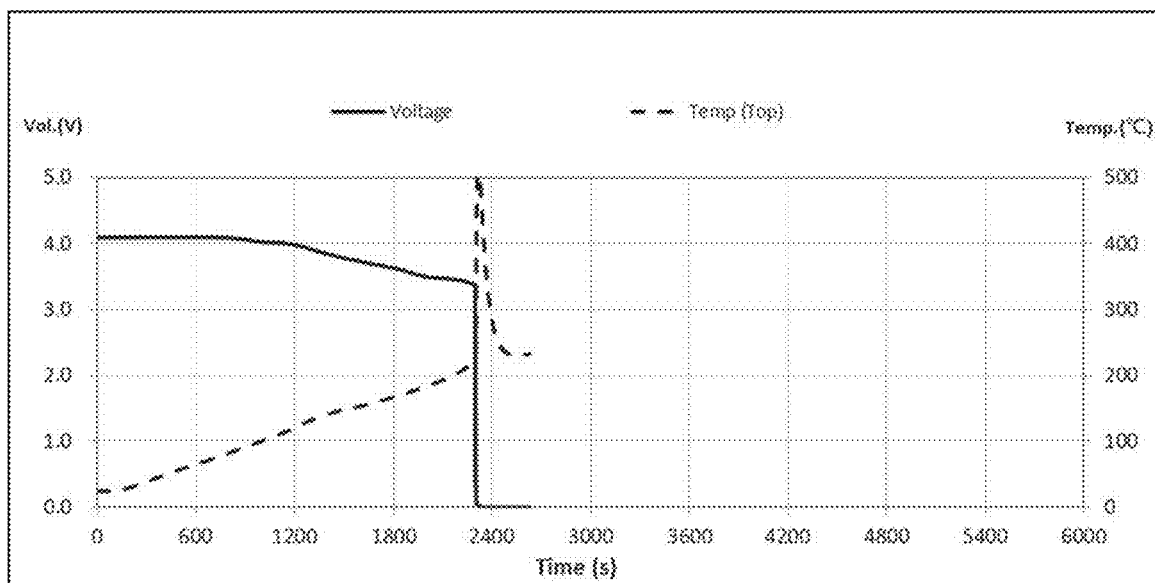
FIG. 6A shows the voltage and temperature curve for the thermal runaway testing of a conventional lithium battery cell.
Figure 6B:
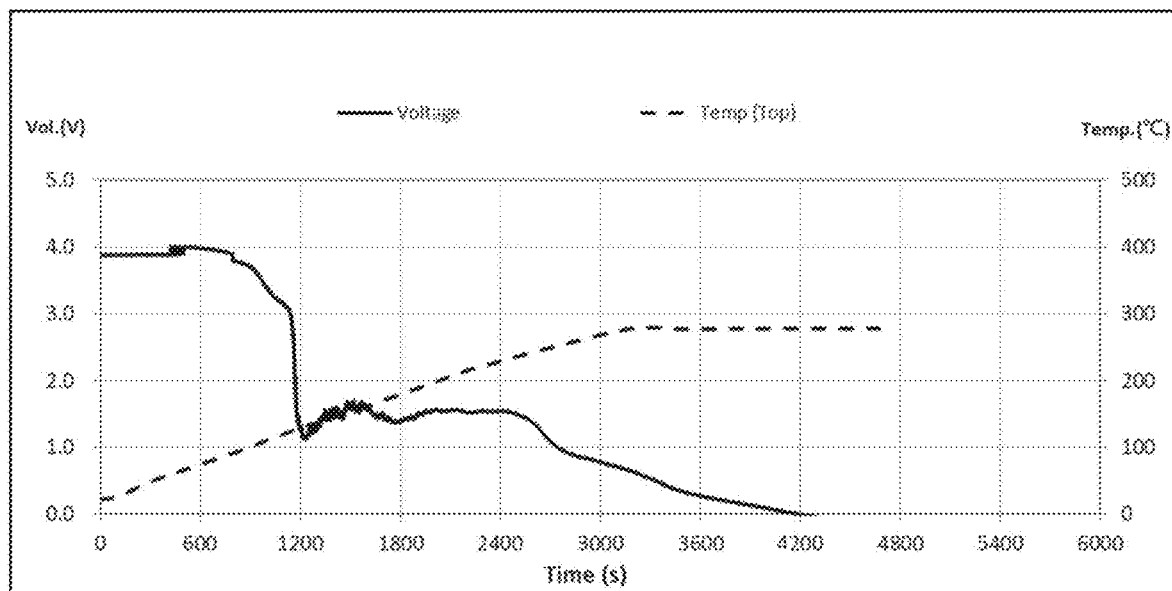
FIG. 6B shows the voltage and temperature curve for the lithium battery cell with thermal runaway suppression of the present invention.

Please refer to FIGS. 6A and 6B. FIG. 6A shows the voltage and temperature curve for the thermal runaway testing of a conventional lithium battery cell. FIG. 6B shows the voltage and temperature curve for the lithium battery cell performing thermal runaway suppression of the present invention. As shown in the figures, when the thermal runaway is occurred and generating heat, the voltage of the conventional lithium battery cell begins to drop down after the temperature reaches around 500° C. However, for the lithium battery cell with thermal runaway suppression of the present invention, the voltage begins to drop down after the temperature reaches around 100° C. by blocking the electrochemical reaction pathway to effectively avoid the thermal runaway.

Figure 7A:
FIGS. 7A to 7C are images of the results of dropping different solutions selected from pure water, $NaOH_{(aq)}$ and $NaAl(OH)_4)_{(aq)}$ respectively on a cathode with a 100% SOC (state of charge).
Figure 7B:
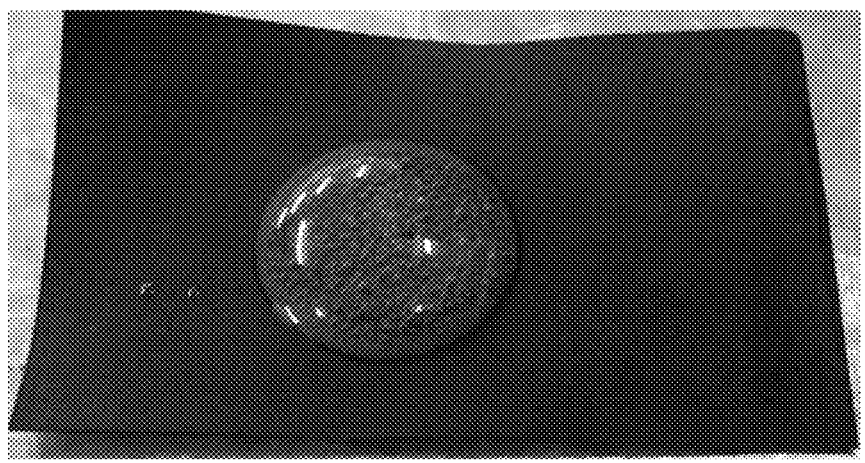
Figure 7C:

FIGS. 7A to 7C are the images for the results of dropping different solutions selected from pure water, $NaOH_{(aq)}$ and $NaAl(OH_4)_{(aq)}$ respectively on a cathode with a 100% SOC (state of charge). In FIG. 7A, it can be seen that the cathode does not react with pure water. In FIGS. 7B and 7C, it can be seen that $NaOH_{(aq)}$ and $NaAl(OH_4)_{(aq)}$ form the droplets in hydrophobic state on the surface of the cathode, and a plurality of tiny bubbles are presented in the droplets.

Figure 8A:
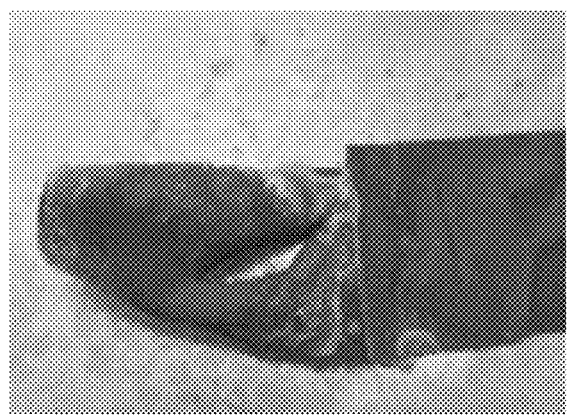
FIGS. 8A to 8C are the images for the results of dropping different solutions selected from pure water, $NaOH_{(aq)}$ and $NaAl(OH)_4)_{(aq)}$ respectively on a anode with a 100% SOC (state of charge).
Figure 8B:
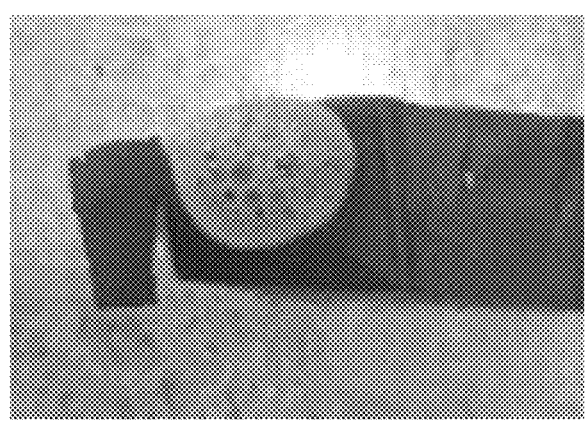
Figure 8C:
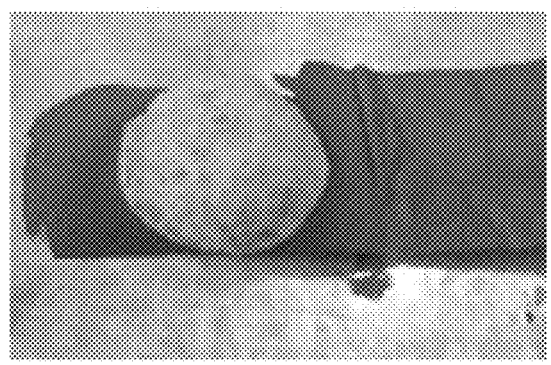
Figure 8D:
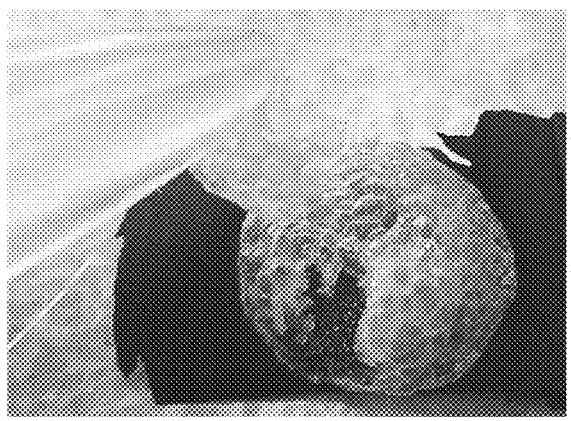
FIG. 8D is the image of FIG. 13C, which the foam is clamped by a jig.

FIGS. 8A to 8C are the images for the results of dropping different solutions selected from pure water, $NaOH_{(aq)}$ and $NaAl(OH_4)_{(aq)}$ respectively on an anode with a 100% SOC (state of charge). In FIG. 8A, it can be seen that the remaining lithium in the anode reacts strongly to pure water and causes the anode to crack. In FIGS. 8B and 8C, it can be seen that $NaOH_{(aq)}$ and $NaAl(OH_4)_{(aq)}$ form the inorganic polymer with bubbles, such like a foam, on the surface of the anode. Also, a part of the inorganic polymer can be clamped by a jig, as shown in FIG. 8D.

Figure 9A:
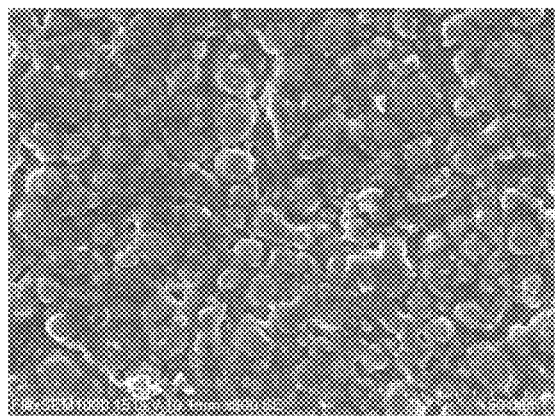
FIGS. 9A and 9B are SEM diagrams of the cathode with a 40% SOC and with a 100% SOC respectively, which 30% sodium hydroxide was dropped over about 1 hour.
Figure 9B:
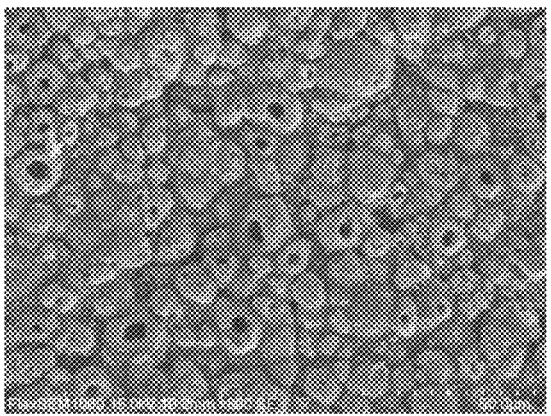

FIGS. 9A and 9B are SEM diagrams of the cathode with a 40% SOC and with a 100% SOC respectively, which 30% sodium hydroxide was dropped over about 1 hour, DMC (dimethyl carbonate) and a pure water were used for surface cleaning, and then dried at 60° C. for 8 hours. As shown in the figures, for the cathode with a 40% SOC, due to the lower lithium-ion extractions, the situation of sodium ions are inserted to the positive of the lithium-ion extractions of the cathode are not significant. However, the undulations of the topography of the surface for the cathode become significant. For the cathode with a 100% SOC, due to the higher lithium-ion extractions, the situation of sodium ions are inserted to the positive of the lithium-ion extractions of the cathode are very significant. The relocation of the lattice and the undulations of the topography of the surface for the cathode with a 100% SOC are also very significant. And it can be observed that parts of the surface even has a cracked state.

Figure 10A:
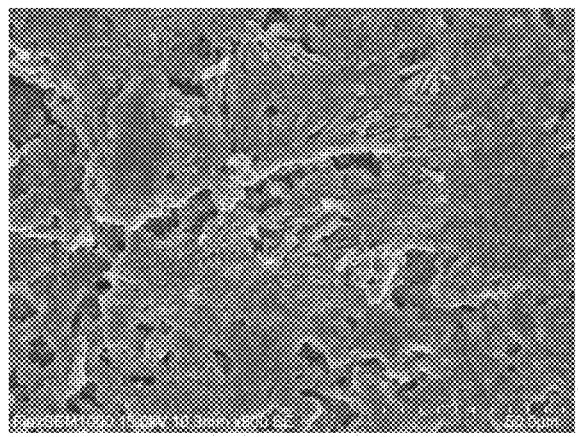
FIGS. 10A and 10B are SEM diagrams of the anode with a 40% SOC and with a 100% SOC respectively, which 30% sodium hydroxide was dropped over about 1 hour.
Figure 10B:
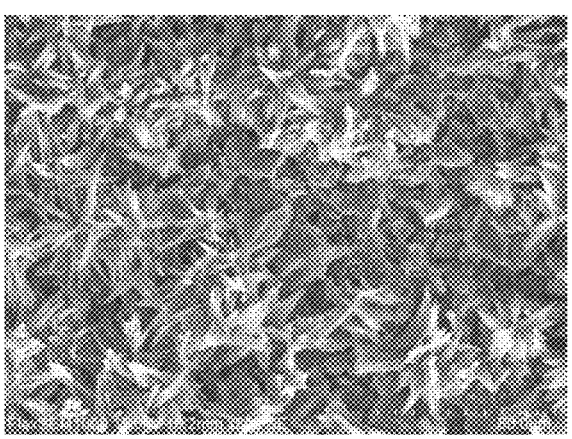

FIGS. 10A and 10B are SEM diagrams of the anode with a 40% SOC and with a 100% SOC respectively, which 30% sodium hydroxide was dropped over about 1 hour, DMC and a pure water were used for surface cleaning, and then dried at 60° C. for 8 hours. As shown in the figures, the sodium hydroxide makes parts of the anode with a 40% SOC form an inorganic polymer (geopolymer), and it also has a needle-like structure of the colloidal silica acid. For the anode with a 100% SOC, the needle-like structure is more obvious.

Figure 11A:
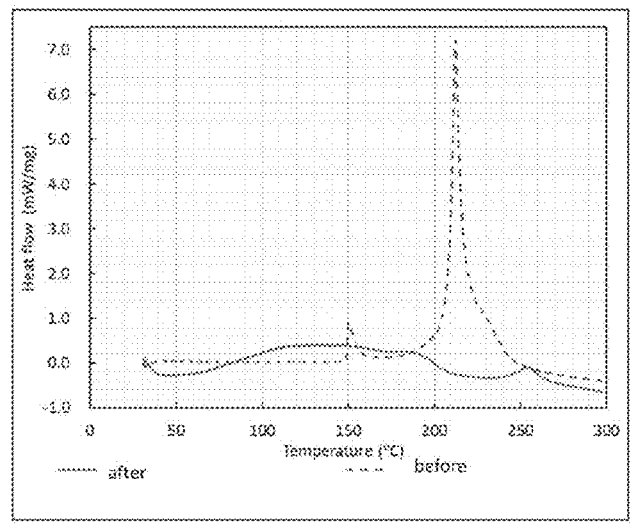
FIGS. 11A and 11B are thermograms of the differential scanning calorimeter for the cathode and the anode using 20% $NaAl(OH_4)_{(aq)}$.
Figure 11B:
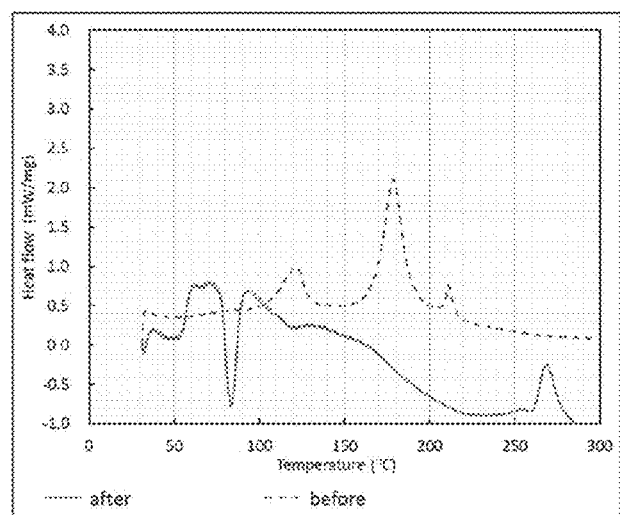

Further, to verify the above-mentioned lower energy of the cathode and the anode, please refer to FIGS. 11A and 11B, which are thermograms of the differential scanning calorimeter for the cathode and the anode using 20% NaAl $(OH_4)_{(aq)}$. It can be clearly seen that a peak of the heat flow of the cathode at about 210° C. has obviously disappeared, see FIG. 11A, and a peak of the heat flow of the anode at about 180° C. has obviously disappeared, see FIG. 11B.

Thus, the thermal runaway suppression element can transfer the positive active material with lithium-ion extraction from an original state with higher electric potential and higher energy to a crystalline state of the metal oxide with lower electric potential and lower energy, and the negative active material with lithium-ion insertion from an original state with lower electric potential and higher energy to an inorganic polymer state with higher electric potential and lower energy. Therefore, the voltage of the whole battery is decreased and the electrochemical reaction pathway is blocked.

Accordingly, the present invention provides a thermal runaway suppression element of lithium batteries and the related applications. When the temperature of the lithium battery reaches to the predetermined temperature, such as 70-130° C., the aluminum current collector to etched through by the aluminum etching ion to act as a path to enter the inside of the electrochemical reaction system. Via the path, the metal ion (A) and the aluminum ion, generated during the etching, are seeped into the electrochemical reaction system and react with the positive active material with lithium-ion extraction and the negative active material with lithium-ion insertion to a state with lower energy. The voltage of the whole battery is decreased and the electrochemical reaction pathway is blocked to prevent the thermal runaway from occurring. Moreover, comparing to the conventional arts, the method for suppressing thermal runaway of the invention is performed directly on the active materials that generate the maximum energy to cause the thermal runaway and being the main reaction body of the entire electrochemical reaction. Also, the metal ion (A) will be driven by acquired thermal energy to fill the positive of the lithium-ion extraction or intercalation, and relocate the lattice to form a new stable state, and at the same time, the thermal energy is consumed. Also, the release of oxygen caused by structural instability and the chain uncontrollable reaction derived therefrom are suppressed. The negative active materials with lithium-ion insertion will act with the metal ion (A), such as a non-lithium alkali metal ion, an alkaline earth metal ion or a combination thereof, and the aluminum ion to form a polymer compounds with lower energy. Therefore, both of the positive active materials and the negative active materials would stay with lower energy to improve safety of the lithium batteries, and terminate the thermal runaway of the lithium battery effectively and quickly. Furthermore, due to the thermal runaway suppression element is disposed outside the lithium battery, it will not affect the efficiency or composition of the electrochemical reaction system of the lithium battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A thermal runaway suppression element, adapted for a lithium battery, the thermal runaway suppression element comprising:

a passivation composition supplier, for releasing a metal ion (A) and an aluminum etching ion (B), and wherein the metal ion (A) is selected from a non-lithium alkali metal ion, an alkaline earth metal ion or a combination thereof; and a polar solution supplier, for releasing a polar solution to carry the metal ion (A) and the aluminum etching ion (B) to an aluminum current collector of the lithium battery, wherein the aluminum current collector is etched through by the aluminum etching ion (B) and an aluminum ion is exchanged, and wherein the metal ion (A) and the aluminum ion are carried by the polar solution inside the lithium battery and seeped into the electrochemical reaction system to terminate an electrochemical reaction.

2. The thermal runaway suppression element of claim 1, wherein the metal ion (A) and the aluminum etching ion (B) are released when the passivation composition supplier is dissociated in the polar solution.

3. The thermal runaway suppression element of claim 1, wherein the metal ion (A) is selected from a sodium ion, a potassium ion or a combination thereof.

4. The thermal runaway suppression element of claim 1, wherein the passivation composition supplier further releases an amphoteric metal ion (C).

5. The thermal runaway suppression element of claim 1, wherein the aluminum etching ion (B) is selected from a hydroxide ion or a nitrate ion.

6. The thermal runaway suppression element of claim 1, wherein the passivation composition supplier is $NaAl(OH)_4$.

7. The thermal runaway suppression element of claim 1, further comprising an isolating mechanism to separate the passivation composition supplier and the polar solution supplier.

8. The thermal runaway suppression element of claim 7, wherein the isolating mechanism is selected from a protecting layer or a capsule without holes.

9. The thermal runaway suppression element of claim 8, wherein the protecting layer or the capsule is made of a thermosensitive decomposition material or a dissolvable material, which is dissolved in the polar solution.

10. The thermal runaway suppression element of claim 7, wherein the polar solution supplier is water-releasing compound decomposed endothermically to release water, the passivation composition supplier is anhydrous, and the isolating mechanism is a polymer layer with holes to cover the passivation composition supplier and the polar solution supplier.

11. The thermal runaway suppression element of claim 1, wherein the passivation composition supplier or the polar solution supplier is attached to a structural supporting material.

12. The thermal runaway suppression element of claim 11, wherein the structural supporting material is capable of absorbing solutions.

13. The thermal runaway suppression element of claim 12, wherein the structural supporting material is selected from a paper, a polymer fiber, a gel polymer or a glass fiber.

14. The thermal runaway suppression element of claim 1, further comprising a metal mesh frame with through holes, wherein the passivation composition supplier and the polar solution supplier are filed in the through holes.

15. The thermal runaway suppression element of claim 1, wherein the polar solution supplier is water-releasing compound decomposed endothermically to release water.

16. The thermal runaway suppression element of claim 1, further comprising a film-forming agent to mix with the passivation composition supplier and/or the polar solution supplier to form a film.

17. The thermal runaway suppression element of claim 1, wherein the polar solution supplier is added with a hydrophilic material with a boiling point higher than the pure water.

18. The thermal runaway suppression element of claim 1, wherein the passivation composition supplier is composed of more than two compounds.

19. A battery structure capable of suppressing thermal runaway, including a lithium battery with an aluminum current collector, wherein a thermal runaway suppression element of claim 1 is disposed on an open-side surface of the aluminum current collector.

20. The battery structure of claim 19, further comprising another lithium battery, and the thermal runaway suppression element is located between the two lithium batteries.

21. The battery structure of claim 19, further comprising a U-shaped metal sheet disposed between the two main bodies, wherein the U-shaped metal sheet includes two parallel arms and a cross member connected thereof, and the two parallel arms and the cross member form a space to contain the thermal runaway suppression element.

22. The battery structure of claim 19, further comprising a restricting layer for an etching direction, disposed surrounded a side wall of the thermal runaway suppression element.

23. The battery structure of claim 19, wherein the aluminum current collector includes a groove at the open-side surface, wherein the passivation composition supplier and the polar solution supplier are filed in the groove.

24. The battery structure of claim 23, wherein the groove is formed by a plurality of bumps located on the aluminum current collector.

25. The battery structure of claim 24, wherein the bumps are made of a metal, a glass or a polymer, which is inert to thermal runaway suppression element.

26. The battery structure of claim 19, wherein the aluminum current collector includes a plurality of auxiliary slots at the open-side surface, which do not penetrate through the aluminum current collector, wherein the auxiliary slots is used to facilitate etching.

* * * * *